(No Model.)
G. H. HOWE.
HARVESTING MACHINE.
No. 330,330. Patented Nov. 10, 1885.
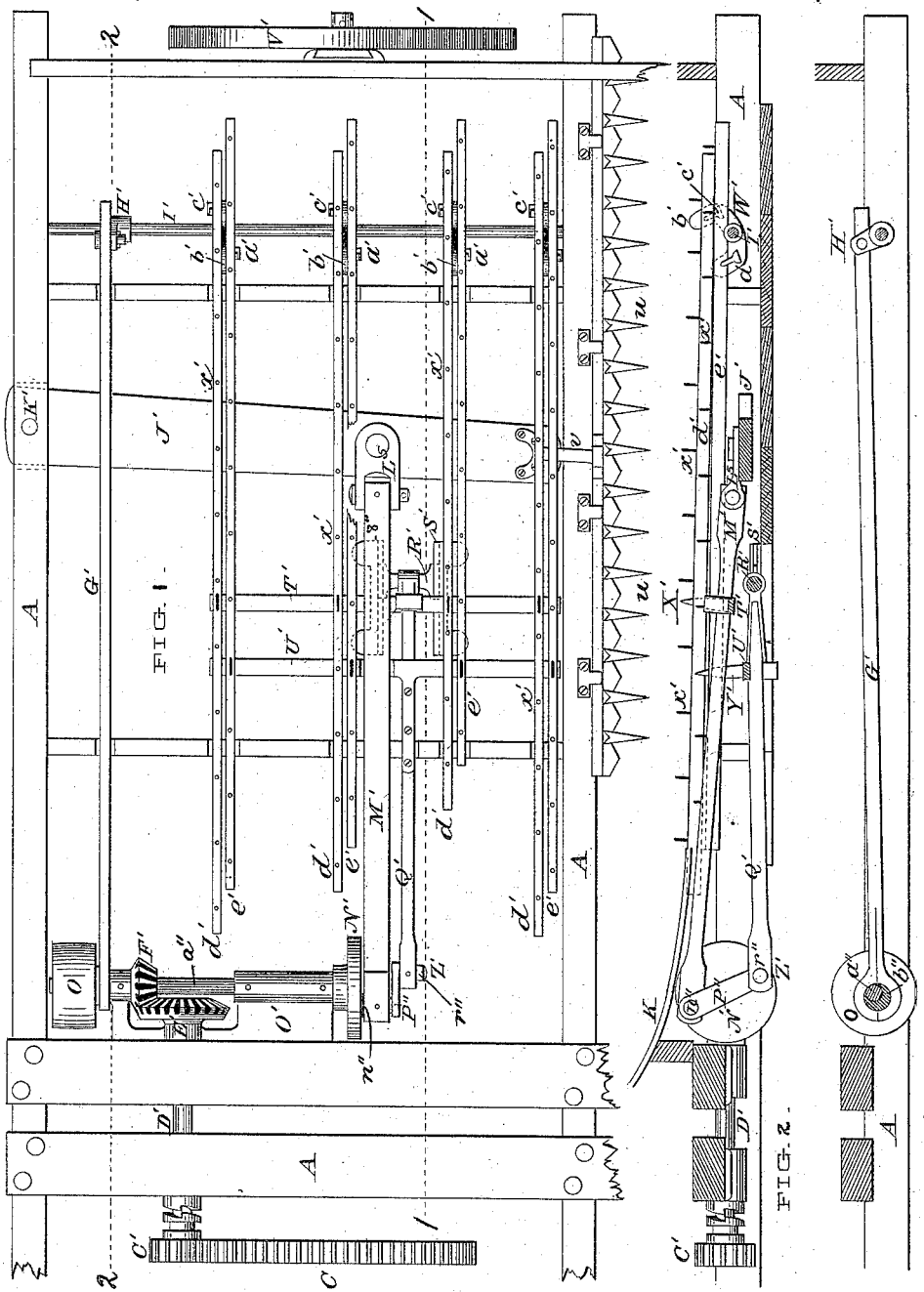
WITNESSES:
INVENTOR:
George Hutchins Howe

UNITED STATES PATENT OFFICE.

GEORGE HUTCHINS HOWE, OF HOOSICK FALLS, NEW YORK, ASSIGNOR TO THE WALTER A. WOOD MOWING AND REAPING MACHINE COMPANY, OF SAME PLACE.

HARVESTING-MACHINE.

SPECIFICATION forming part of Letters Patent No. 330,330, dated November 10, 1885.

Application filed April 7, 1883. Serial No. 90,990. (No model.)

*To all whom it may concern:*

Be it known that I, GEORGE H. HOWE, of the village of Hoosick Falls, county of Rensselaer, and State of New York, have invented certain new and useful Improvements in Harvesting-Machines; and I do declare the following to be a full, accurate, and complete description of the same, reference being had to the accompanying drawings, making part of this specification, in which—

Figure 1 is a plan view of the harvester-platform, with its grain-carriers and a portion of the machinery for driving the same. Fig. 2 is a section taken on the line 1 1 of Fig. 1. Fig. 3 is a section taken on line 2 2, Fig. 1.

Similar letters of reference refer to the same parts in the different figures.

To enable others skilled in the art to construct my invention, I will proceed to describe the same with reference to the drawings.

The nature and object of this invention is to secure a cheap and effective manner of carrying the cut crop as it falls upon the platform to the binding apparatus.

A is the main frame, which supports the platform and the cutting apparatus of the harvester. This frame is supported on the axles of the usual driving-wheel and outer or grain V'.

$u$ are the guard-fingers, fastened to the finger-bar, which forms the front piece of the main frame, and through which the cutters work in the usual way, being oscillated by the sway-bar J'. The reel which gathers the standing crop and delivers it onto the platform in the usual way is not shown in the drawings. The gear-wheel C is fast to the main driving-wheel and meshes into and drives the pinion C', and by means of clutches imparts motion to shaft D', on which is fast bevel gear-wheel E', which meshes into bevel-pinion F', fast to shaft $a''$. Shaft $a''$ is supported in bearings on casting O'. The front end of this shaft is furnished with a crank-wheel, N', which is rigidly connected to it. This crank-wheel has a crank-pin, $n''$, on it, and on this crank-pin is pivoted the pitman M', which is connected with and drives the sway-bar J', which drives the cutters, the sway-bar being pivoted on the rear girt of the frame at K', its forward end being connected to the cutters. The crank-pin $n''$ is made long enough to receive an arm, P'', which runs across the disk of N' in the line of a diameter of N'. At the opposite end of P'' is pivoted, at $r''$, the pitman Q', which is fastened at its other end to the bar R', which slides in ways S', which are supported on the bottom boards of the platform. On the pitman Q' is fastened rigidly the cross-bar U', which extends forward nearly to the finger-bar and rearward partly across the platform. On the cross-bar U' are supported a series of sticks, $e'$, which run lengthwise of the platform. They are supported on pins Y', projecting upward from the bar U'. These pins are made tapering and pass through slots in the sticks $e'$. The slots are made long enough so the sticks can be readily removed and the pins project upward far enough to take hold of the grain on the platform. On the pitman M', which drives the sway-bar, is a cross-bar, T', similar to U', and parallel with it, and furnished with another set of sticks, $d'$, similar to $e'$, and supported by similar pins, X'. The two sets of sticks are arranged in pairs, one, $d'$, and one, $e'$, forming a pair, as shown.

On the grain end of the platform, a short distance from the end, is a rock-shaft, I', which is journaled in the front and rear girts of the main frame. On the rock-shaft I' are rigidly fastened castings W' for each pair of sticks. W' is made in curved form with two horns projecting upward, crescent-shaped, and each horn is furnished with a bracket, $a'$, on one side and $c'$ on the other side, to receive the sticks, the sticks dropping loosely into the brackets, so as to slide freely therein. All the sticks $e'$ and $d'$ are provided with pins $x'$, which extend upward to pierce the grain on the platform. The rock-shaft I', at its rear end, has a crank-arm, H', fastened to it, and to the end of the arm is attached one end of the pitman G', which connects with an eccentric, $b''$, on shaft $a''$. Thin boards K are supported by cross-bars running from front to rear of the platform and cover the arms and sway-bar and form the top of the platform, on which the cut grain falls, and are carried on the binder end of the machine. Then boards are placed in such a way as to leave an opening between their edges to allow the sticks $e'$ and $d'$ to pass through, in order that the pins $x'$ may take hold of the grain on the platform.

Motion is communicated to the shaft $D'$ from the driving-wheel, through the gears $C$ and $C'$, clutches and gear-wheels $E'$ and $F'$, to the shaft $a''$, and by this shaft to the wheel $N'$ and its crank-pin $n''$ to the pitmen $M'$ and $Q'$, and by the eccentric $b''$ to the pitman $G'$ and the rock-shaft $I'$.

It is plain that the sticks $e'$ and $d'$ will be oscillated back and forth in the line of their length, and while so oscillated each set of sticks $e'$ and $d'$ will alternately move forward and back, and when moving forward the pins will be engaged with the grain on the platform, and when moving backward the pins will be lower than the grain and below the surface of the platform, the forward end of the sticks being supported on the pitmen $M'$ and $Q'$, between their crank ends and their other ends, and their rear ends raised by the the cranks $H'$ on the rock-shaft $I'$. This gives an up-and-down movement parallel with the platform. By this arrangement the mechanism for moving the cut grain across the platform to the binding mechanism can be made to occupy less vertical space than devices hitherto employed, so as to take up less space between the stubble and the top of the platform, as the perpendicular movement is only one-fourth, or thereabout, of the upward and and downward movement.

In harvesting-machines, when the cutters are driven by a pitman direct from the crank-shaft in front or rear of the driving-wheel, instead of a sway-bar, as shown in this machine, the crank-shaft which drives the cutters may be made to extend across or partly across the machine and be furnished with a double crank and a pitman on the end which drives the cutters, to give a longitudinal movement to the cross-bars $U'$ and $T'$, and in this case I employ another rock-shaft, like $I$, to give the up-and-down motion to the sticks at the end which is raised, as hereinbefore described, by the sway-bar and pitmen $Q'$ and $M'$. The cut grain falls upon the grain-platform behind the cutters, and is moved along the platform by the pins $x'$ and $X'$ toward the binder.

Having thus fully described my invention, what I claim therein as new, and desire to secure by Letters Patent, is—

1. The combination, with the crank-shaft, of the sway-bar $J'$, the pitmen $M'$ and $Q'$, the cross-bars $U'$ and $T'$, the sticks or bars $d'$ and $e'$, and mechanism connecting said bars $d'$ and $e'$ to the cross-bars $U'$ and $T'$, substantially as and for the purpose described.

2. The combination of a rock-shaft, the double connections $W'$, and the reciprocating sticks or bars, substantially as and for the purpose described.

GEORGE HUTCHINS HOWE.

Witnesses:
DANFORTH GEER,
W. B. MASSON.